Patented Jan. 31, 1928.

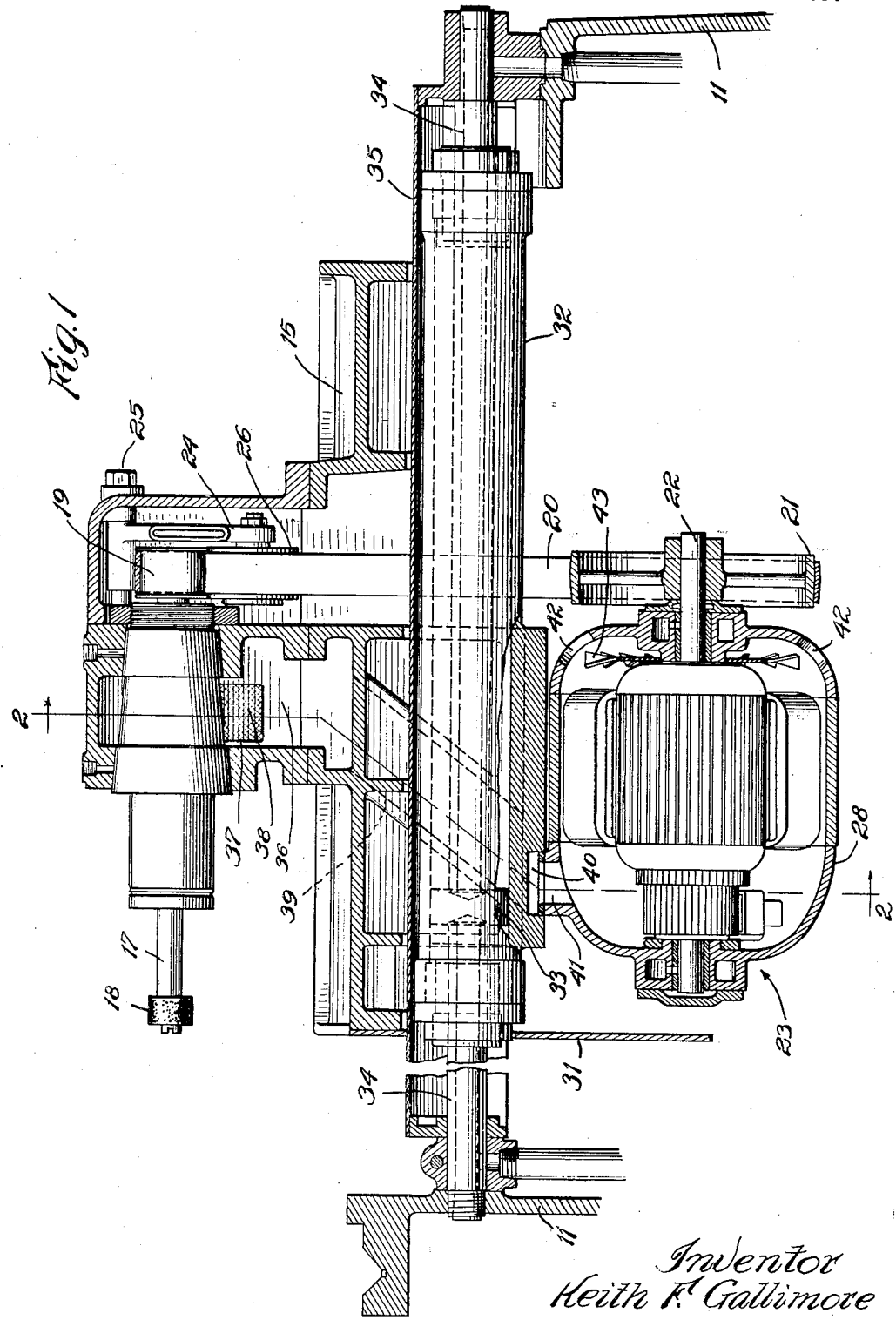

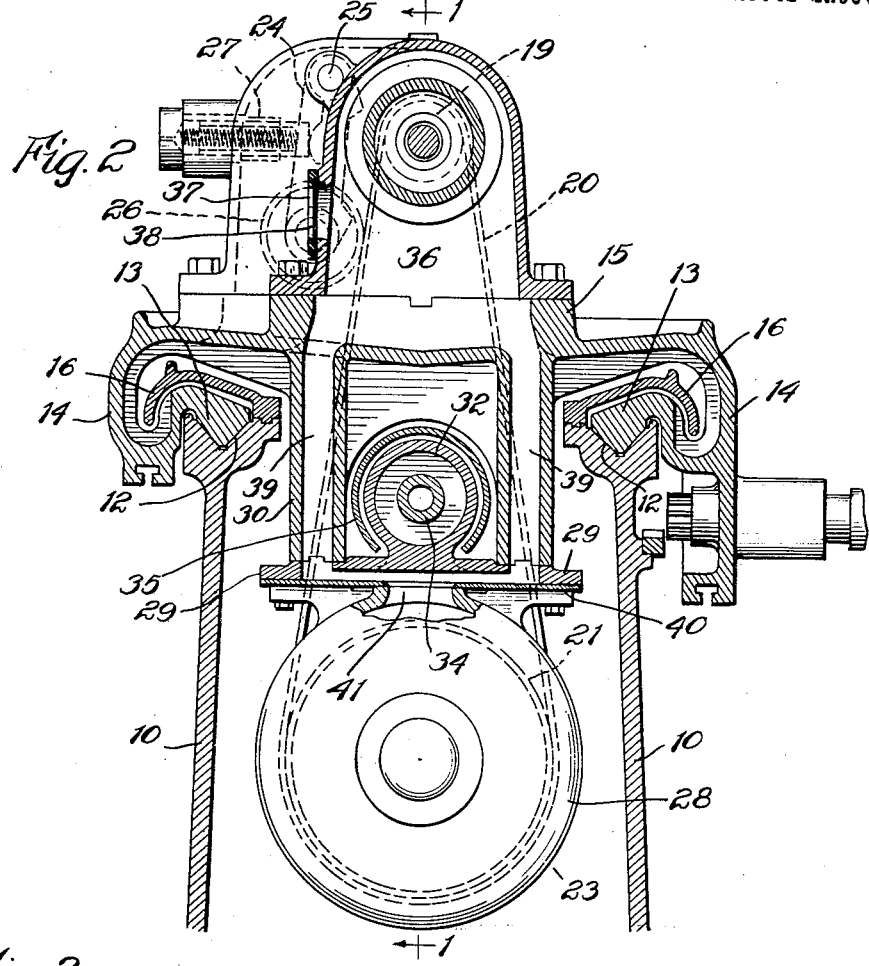

1,657,824

UNITED STATES PATENT OFFICE.

KEITH F. GALLIMORE, OF FOND DU LAC, WISCONSIN, ASSIGNOR, BY MESNE ASSIGNMENTS, TO THE HEALD MACHINE COMPANY, OF WORCESTER, MASSACHUSETTS, A CORPORATION OF MASSACHUSETTS.

MACHINE TOOL.

Application filed February 10, 1923. Serial No. 618,283.

This invention relates to machine tools and is herein shown as applied to a grinding machine of the type which is fully disclosed in a patent to Prentice Conradson et al., No. 1,534,302, granted April 21, 1925. The invention relates more particularly to improvements in the grinding spindle carriage and the casing supported thereby for housing the driving motor.

In the machine shown in the patent herein referred to, the driving motor is mounted on the underside of the carriage beneath the spindle to travel with the carriage, and is enclosed by the machine base and the carriage housing. The motor windings and commutator are completely enclosed within a motor casing to protect them from the mist, falling coolant and abrasive particles present within the base. The casing and the machine walls, however, interfere with a proper ventilation and cooling of the motor windings, thereby endangering the overheating of the motor.

The primary object of my invention is to provide means for properly ventilating and cooling the motor without in any way dispensing with the advantageous features afforded by mounting and enclosing the motor in the manner disclosed above.

I accomplish this object by providing suitable passages through the carriage and motor casing with air propelling means, whereby air, which is comparatively dry and clean, is drawn through the motor windings and then expelled at the rear end of the motor casing.

Further objects and advantages will become apparent as the description proceeds.

In the accompanying drawings, Figure 1 is a vertical sectional view, taken in the plane of line 1—1 of Fig. 2, of a grinding machine embodying the features of my invention.

Fig. 2 is a transverse vertical section taken in the plane of line 2—2 of Fig. 1.

Fig. 3 is a fragmentary plan view of the carriage with the spindle and its housing removed.

While my invention is susceptible of various modifications I have shown in the drawings and will herein describe in detail, the preferred embodiment, but it should be understood that I do not thereby intend to limit the invention to the exact construction disclosed, but aim in the subjoined claims to cover all modifications and alternative constructions falling within the scope of the invention.

Referring to the drawings, the base of the grinding machine is herein represented as comprising two side walls 10 and two end walls 11. On the upper edges of the side walls are formed grooves or ways 12 to receive the V-shaped ribs or guides 13 formed on the opposite sides 14 of the carriage body 15. 16 designates guard plates 16 which overlie and protect the ways 12.

Mounted in the upper part of the carriage 15 is a rotary spindle 17 having a grinding wheel 18 on its free end. On its opposite end the spindle 17 supports a pulley 19 adapted to be driven by a belt 20 which runs over a pulley 21 on the armature shaft 22 of a motor 23.

A suitable belt tensioner for the belt 20 is provided comprising in the present instance, an arm 24, pivoted at 25 and carrying a pulley 26 on its free end which is pressed toward the belt by means of a compression spring 27.

The motor 23 is mounted on the underside of the carriage 15 by bolting the motor casing 28 to lateral flanges 29 which in turn are secured to two laterally spaced depending portions 30 on the carriage. A splash plate 31 is fixed to and depends from the front end of the carriage to prevent coolant from being splashed upon the driving motor 23. The motor is thus mounted to move with the carriage, and occupies the space between the walls of the base.

Any suitable means may be employed for reciprocating the carriage 15 upon its ways 12. In the present instance, I employ hydraulic means comprising a cylinder 32 positioned between the depending portions 30 of the carriage and rigidly secured thereto by the lateral flanges 29. A piston 33 in the cylinder 32 is stationarily mounted between the end walls 11 of the machine base by means of hollow rods 34 which project axially from the ends of the piston through the ends of the cylinder. Any suitable actuating fluid such as oil is admitted into the cylinder at opposite sides of the piston through the hollow rods 34. A stationary housing 35 mounted on the machine base almost completely encloses the cylinder 32 and rods 34.

The means for controlling the admission of actuating fluid to the cylinder 32 is fully disclosed in the copending application previously referred to, and since it forms no part of the present invention will not be herein described.

Means is provided for ventilating the motor 23 without exposing the latter to the vapors and suspended emery particles present within the base during the grinding operation. The upper part of the carriage 15 is provided with a chamber 36 opening through one of its side walls at 37. A screen 38 is positioned across the opening to keep out any large suspended particles which may be present in the air.

Comunicating with the chamber 36 at each side are two downwardly and forwardly inclined passages 39 which extend through the depending portions 30 and open at their lower ends into a transverse passage 40 formed in the flanges 29. The passage 40 in turn communicates at its center through an opening 41 with the front interior of the casing 28. Apertures 42 are provided in the rear wall of the casing 28 to furnish an outlet for the heated gases surrounding the motor windings.

Mounted on the rear end of the motor armature to rotate therewith is a fan 43 of the end thrust type which is adapted to draw away the heated gases around the motor windings, and expel them from the casing 28 through the apertures 42. Fresh air will continuously flow into the casing 10 through the chamber 36 and passages 39 and 40 to replace the heated air drawn out by the fan, thereby keeping the motor well ventilated and cooled at all times.

I claim as my invention:

1. A machine tool having, in combination, a hollow base, a carriage mounted on the upper side of said base, a motor having an enclosing casing rigidly secured to the underside of said carriage within said base, said carriage having an air passage leading from a point above said base and communicating with one end of the motor-casing, the opposite end of said casing having an exit opening for the air, and a fan fixed on the armature shaft and arranged to cause air to flow through said passage and through the motor windings.

2. A machine of the character described having, in combination, a hollow case, a carriage mounted to slide on the upper part of said base, means mounted centrally in the lower portion of said carriage for reciprocating the carriage, a motor having an enclosing casing mounted on the underside of said carriage beneath said reciprocating means, said carriage having a chamber and an air passage opening into said chamber at a point above said base, and the carriage having air passages extending from said chamber on opposite sides of said reciprocating means and communicating at one end with one end of the motor casing, the opposite end of said casing having an exit for the air, and means for causing air to flow through said chamber, passages and motor casing.

3. A machine tool having, in combination, a hollow base, a carriage mounted for movement on said base, said carriage having a pair of spaced depending brackets on its under side, means positioned between said brackets for moving said carriage, a motor having a closed casing mounted on the under side on said brackets below said power means, an air passage leading from above the machine tool through said carriage and said depending brackets into said motor casing, and means for causing a flow of air through said passage and motor.

4. A machine tool having, in combination, a base, a carriage slidable on said base and having a spindle, a motor mounted to move with said carriage and operatively connected to said spindle, said motor comprising a protective casing, an air passage leading from above the machine through said carriage to said casing, and means for causing a flow of air through said passage into said casing and through the motor windings to carry away the heat generated during operation.

5. A machine tool having, in combination, a base, a carriage on said base, a motor mounted on said carriage, an air passage leading through said carriage to the motor windings, and means for causing a current of air to flow through said passage.

6. A machine tool having, in combination, a closed base having a pair of guideways on its upper edges, an elongated carriage reciprocable on said guideways, a spindle rotatably mounted in said carriage, a motor having a closed casing mounted within said base on the under side of said carriage, a splash plate secured to said carriage directly ahead of said motor, and means for directing and inducing a flow of air from without the machine base directly through said motor casing to obtain clear, dry ventilation.

7. A machine tool having, in combination, a closed base, a carriage reciprocable on said base, a motor having a closed casing in the under side of said base, and means for inducing and directing a confined current of air to said casing from without said base.

8. A machine tool having, in combination, a hollow base, a carriage mounted for movement on said base, said carriage having a pair of spaced depending brackets on its underside, means for moving said carriage positioned between and spanning said brackets, a motor having a closed casing mounted on the underside of and spanning said brackets, an air passage leading from the outside of the machine tool through said carriage and then through said depending brackets, and an air passage formed between said first mentioned means and the upper side of said motor casing, and serving to connect the lower ends of the air passage in said brackets to said motor casing.

In testimony whereof, I have hereunto affixed my signature.

KEITH F. GALLIMORE.